A. F. GALL.
PRODUCTION OF MOTION PICTURE FILMS.
APPLICATION FILED AUG. 7, 1914.
1,187,137.
Patented June 13, 1916.
2 SHEETS—SHEET 1.
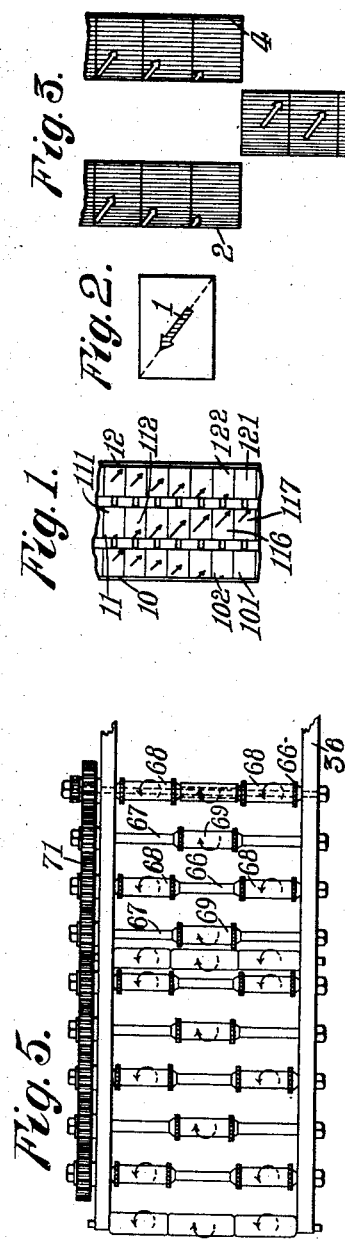
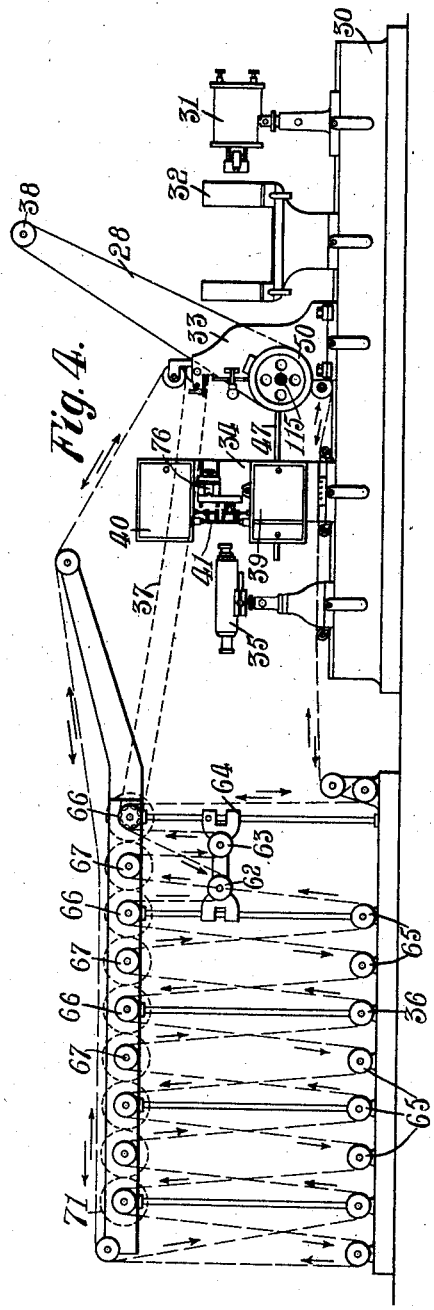
WITNESSES:
J. A. Brophy
William A. Hardy
INVENTOR
Adolph F. Gall
BY Dyer and Holden
HIS ATTORNEYS A. F. GALL.
PRODUCTION OF MOTION PICTURE FILMS.
APPLICATION FILED AUG. 7, 1914.
1,187,137.
Patented June 13, 1916.
2 SHEETS—SHEET 2.
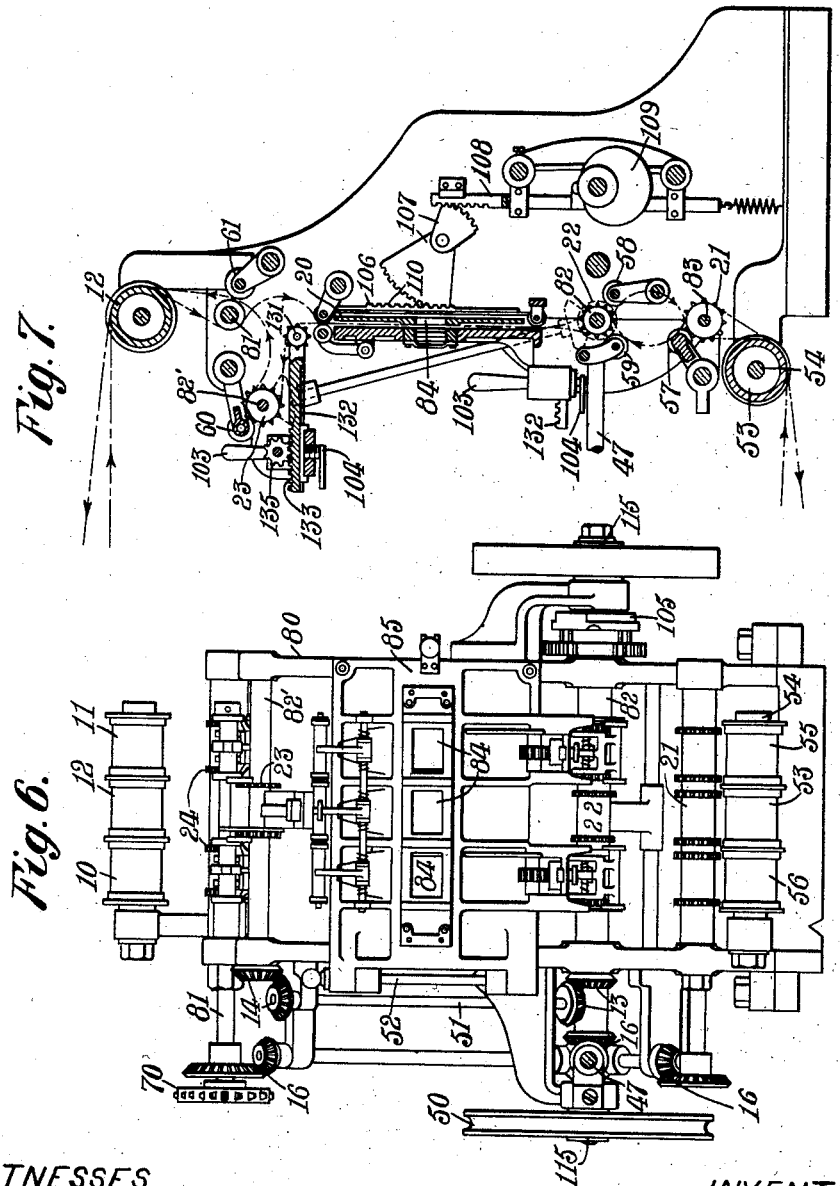
WITNESSES
J. A. Brophy
William A. Hardy
INVENTOR
Adolph F. Gall
BY Dyer and Holden
HIS ATTORNEYS

UNITED STATES PATENT OFFICE.

ADOLPH F. GALL, OF WEST ORANGE, NEW JERSEY, ASSIGNOR TO NEW JERSEY PATENT COMPANY, OF WEST ORANGE, NEW JERSEY, A CORPORATION OF NEW JERSEY.

PRODUCTION OF MOTION-PICTURE FILMS.

1,187,137.  Specification of Letters Patent.  Patented June 13, 1916.

Original application filed October 12, 1911, Serial No. 654,224. Divided and this application filed August 7, 1914. Serial No. 855,651.

*To all whom it may concern:*

Be it known that I, ADOLPH F. GALL, a citizen of the United States, residing at West Orange, in the county of Essex, State of New Jersey, have invented certain new and useful Improvements in Production of Motion-Picture Films; and I do declare the following to be a full, true, and exact description of the said invention, such as will enable others skilled in the art to which it appertains to make and use the same.

This application is a division of my application, Serial No. 654,224, filed October 12, 1911, and entitled Apparatus for producing motion picture films, on which Patent No. 1,109,917 was granted to me on September 8, 1914.

This invention relates to a method for producing a motion picture film with a plurality of parallel rows of pictures thereon. The different rows of pictures on a film of this character may represent different scenes or each row may represent a continuation of the scene represented by one of the other rows. When films of this type are sufficiently long, they are made up into rolls and when the film is exhibited, the direction of travel of the film is reversed when the end of each row is reached, as the film is alternately unrolled and rolled up. Thus, in a positive film having three rows of pictures, such as I have shown in Fig. 1 of the drawings for purposes of illustration, one outside row will be exhibited by passing the film in one direction, for instance, downward, past the lens with that row behind the lens, until the end of the row is reached; the film is then shifted sidewise until the second row of pictures is behind the lens and the film is then moved in the opposite direction, or upward until the end of that row is reached; then the film is again moved sidewise to bring the third row opposite the lens and the film is then moved in the original direction. This would be continued for any number of rows that the film might contain. Since each individual picture on such a film is projected upon the screen in identically the same manner as all others on the film, without regard to the direction from which it is brought opposite the lens, all of the pictures must have the same relation to the film; that is, the base or ground line of each of the pictures will be toward one end of the film and the top or sky line toward the other end. If the original scene photographed is to be exactly reproduced, the sequence in which the pictures are exhibited on the screen must be the same as that in which they were originally taken; that is, the first picture taken must be the first exhibited, followed by the second picture taken, and so on, to the end of the scene. In order to accomplish this, the sequence of the pictures in the rows exhibited by moving the film in one direction must be the reverse of that in the rows shown when the film is moved in the opposite direction. This will be more clearly shown by referring again to Fig. 1. Supposing that the original scene photographed was the flight of a black arrow 1 upwardly and to the left, as shown in Fig. 2, then the photographs of the left hand row of Fig. 1 would represent successive positions of the arrow 1 as it moved across the field of vision or as it appears to move on the screen when projected in the regular way. In this scene, the arrow in each picture points toward the top or sky line of that picture and away from the base or ground line. For convenience of illustration, I have represented the same scene on each of the three rows of the positive film shown in Fig. 1, and it will be seen that picture 101 in row 10, and picture 111 in row 11 occupy the same relation to the film so far as the objects in the picture itself are concerned. It will be seen, however, that picture 102 of row 10 is adjacent the base or ground line of picture 101 of that row, whereas picture 112 of row 11 is adjacent the top or sky line of picture 111 of that row. Row 11 cannot be obtained by a mere shifting or reversal of row 10 as an entirety and must be made by some process which will reverse the original sequence of the pictures without reversing the pictures themselves. By "original sequence" I mean the order in which the pictures are originally taken in the motion picture camera. This usually is such that the first picture is adjacent the sky line of the second picture, the second picture is adjacent the sky line of the third picture, and so on to the end of the negative. By "reversed sequence" I mean a sequence of the pictures which is the reverse of the "original sequence", the position of each picture in reference to the axis of the film being unchanged. Thus, if the original sequence is the one I have just described, in the reverse sequence, the first picture is adjacent the ground line of the second picture, instead of the sky line of the second picture, the second picture is adjacent the ground line of the third picture, instead of the sky line of the third picture, and so on throughout the strip.

Ordinarily motion picture cameras are constructed to move the film across the lens from the top downward. This produced the usual sequence first described above. The handle of the cameras may be turned backward or the camera may be so constructed as to move the film from the bottom upward, in which case the original sequence would be the reverse of the usual sequence first described above or the same as the one I have last described.

In the drawings, Figure 1 represents a positive film made in accordance with my invention and having three rows of pictures; Fig. 2 represents diagrammatically the original scene photographed and the pictures of which are reproduced on the positive film of Fig. 1; Fig. 3 is a view showing three negatives containing pictures of the scene of Fig. 2 and from which the positive film of Fig. 1 is produced; Fig. 4 represents a side elevation of a complete machine for carrying out my improved method; Fig. 5, a plan view of the film bank partly broken away, of the machine of Fig. 4; Fig. 6, a front view of the negative handling mechanism of the machine shown in Fig. 4; and Fig. 7, a cross section thereof on the line 7—7 of Fig. 6.

Each row of pictures on the positive film shown in Fig. 1, may and usually would represent scenes photographed at different times and without regard to the positions they were to occupy on the positive film. All of the negatives would therefore be in original sequence and the problem presented is to devise a simple and economical method of producing from a series of negatives, all in original sequence, a positive like Fig. 1, with the pictures of some of its rows in original and the remainder in reversed sequence. I have found that this may be accomplished by the method which consists, broadly, in placing the negatives side by side, passing light through one picture on each of the negatives, to the sensitized film on which the print is to be made, then closing off the light, and moving all of the negatives whose pictures are to be printed in original sequence, in one direction, and moving in the opposite direction all of the negatives whose pictures are to be printed in reversed sequence, all of such negatives being moved the space of one picture only, and then passing light through the next picture on each of the negatives to a fresh portion of the sensitized film, continuing this cycle to the end of the negatives. The light may be passed through the negatives directly to the sensitized film as in contact printing, or it may be passed through a lens after passing through the negatives and before striking the sensitized film, as in projection printing.

In contact printing, the negative and sensitized films, are ordinarily moved in the same direction, in which case a positive is printed with its pictures in the same sequence as the pictures on the negatives. If a positive with pictures in a sequence the reverse of the sequence of the negative should be required, the negative would have to be moved in one direction and the sensitized film in the opposite direction.

In projection printing, the negative and sensitized films are ordinarily moved in opposite directions, which produces a positive with pictures in the same sequence as those of the negative, the lens reversing each picture to produce this effect. If the negative and sensitized films should be moved in the same direction, a positive in reverse sequence to the negative would be produced.

I may use either the contact or the projection method in printing the film of Fig. 1, although I prefer the latter. By the projection method, I am able to produce pictures on the positive which are smaller or larger in size than the corresponding pictures on the negatives, the lens in such case being adjusted to project on the sensitized surface a reduced or enlarged image of the picture on the negatives.

In printing from negatives all in original sequence, the positive film shown in Fig. 1, therefore, I prefer to use the method which consists in placing the negatives side by side in proper relation according to the positive to be printed, passing light through one picture of each negative, the light passing through a lens before striking the sensitized film; then closing off the light, moving all of the negatives whose pictures are to be printed in original sequence in one and the same direction, moving in the opposite direction all of the negatives whose pictures are to be printed in reversed sequence, and moving the sensitized film in the opposite direction to that in which the negatives whose pictures are to be printed in original sequence were moved, all of the negatives being moved a distance sufficient to bring the next picture opposite the lens, and the sensitized film being moved a distance sufficient to bring a fresh portion of its surface opposite the lens; then again passing light through the negatives and the lens, and repeating these steps to the ends of the negatives. The positive film is then properly developed and fixed, when it is ready to be projected. It should be understood, however, that while the method just described is the one which I prefer, I may substitute contact for projection printing, in which case the negatives would be moved in the same direction as in projection printing, and the sensitized film in the opposite direction, to that in which it is moved in projection printing or vice versa.

For purposes of further illustration of my method, I will assume that it is desired to produce a positive, which when projected on a screen, will reproduce the scene shown in Fig. 2, which represents the flight of a black arrow across the field of vision from the ground at the right toward the sky and to the left. For ease of illustration I have assumed that the different rows of pictures in Fig. 1 are such that each of them will depict this flight of the arrow when projected on the screen. To produce such a film as shown in Fig. 1, according to my method, it would be necessary first to have three negatives as shown at 2, 3, and 4 in Fig. 3, each exactly alike, in original sequence, and as they would be taken of the scene depicted, in the ordinary camera. These three negatives would be placed side by side, with the first picture on the two outside negatives and the last picture on the middle negative in alinement. These three pictures on the negatives are then exposed simultaneously, resulting in pictures 101, 117 and 121 on the positive. The light is then shut off, and the two outside negatives are moved downwardly and the middle negative upwardly a distance equal to the height of one picture, thus bringing the second pictures of the two outside negatives and the next to the last picture of the middle negative in alinement. The sensitized film is also moved downwardly if the contact method of printing is used and upwardly if the projection method is used, and the light again passed through the three pictures on the negatives which are in alinement, and pictures 102, 116 and 122 on the positive are the result. This method will be continued until all of the pictures on the negatives have been printed on the positive, when the film of Fig. 1 will result, after it has been properly developed and fixed. An inspection of Figs. 1 and 3 will show that the pictures of the middle negative have had their sequence reversed in the printing of the middle row of the positive, whereas the two outside rows of the positive are in the same sequence as the two outside negatives.

While I have described my process as applied to the positive film illustrated in Fig. 1, it will, of course, be understood that I am not limited to this specific film. By my process, any positive having two or more rows of film, some in original and some in reverse sequence, may be produced, and it is also immaterial whether the rows with the pictures in reverse sequence are between those in the original sequence or not. It will also be understood that, while for convenience of illustration I have shown a positive with only seven pictures to each row, as a matter of fact, there is no limit to the length of each of the rows except the length of the film.

While my method just described may be carried out by hand, it may also be done by mechanism, and I have illustrated in the drawings a simple means for doing this. This mechanism is in general like that shown in my co-pending application No. 654,226, filed October 12, 1911 in which the details of the device have been shown more fully.

Referring now to Fig. 4, 30 is a bed plate on which is mounted a source of light 31, a system of condensing lenses 32, the mechanism for handling the negative films represented generally by 33, the mechanism for handling the sensitized film represented generally by 34, and at 35 is shown a telescope for focusing purposes. 36 represents a bank of rollers to be described more in detail hereafter, these rollers being used to support the negatives when they are made up in continuous bands, as is sometimes convenient. 38 represents a source of power to operate the machine, connected by a belt 28 with a pulley 50 on the main driving shaft 115 of the negative handling mechanism 33 of Fig. 4. 47 is a shaft conveying power from the shaft 115 to the mechanism 34.

In Fig. 4, 33 represents generally a mechanism in which a plurality of negative films may be moved intermittently past exposure openings, some of the films being moved in one direction and the remainder in the opposite direction, all of the films being brought to rest before the exposure openings while light is passed through them from the source of light 31.

Referring particularly to Figs. 6 and 7, 80 is a frame supporting the various parts of the mechanism. 82 represents an intermittently operated shaft having sprocket wheels 22 thereon to engage with the perforations in the negatives to be handled by the mechanism. This shaft is given its intermittent motion from the main shaft by means of the well-known Geneva star and pin wheel, represented generally at 105. At the left hand end of the shaft 82 (Fig. 6) is provided a set of bevel gears 13 communicating through the shaft 51 with a second set of bevel gears 14, one of which is on the outer end of the shaft 82'. This shaft 82' has attached to it a sprocket wheel 23 for handling one of the three negatives which may be passed through the machine illustrated. It will be obvious that when the shaft 82 turns, shaft 82' turns in synchronism therewith. 81 and 83 represent shafts at the top and bottom of the mechanism respectively, and these shafts are continuously rotated through the bevel gearing 16 connecting these shafts with the main driving shaft 115. A gate 85 hinged at 52 is provided to bear against the flat portion 20 of the frame 80, and this gate and flat portion of the frame form a chute in which the film during exposure may be held by springs attached to the gate 85 as shown and described in my copending application, Serial No. 654,226 referred to above. The plate 20 also contains an exposure opening 84 for each of the negatives.

I have provided a means by which the negative films may be shifted relatively to each other to enable the photographs thereon to be brought in alinement, and also so that a picture on each will lie directly behind one of the exposure openings 84 at the time light is passed through the negatives. Any form of suitable adjustment may be used for this purpose, but I prefer the form shown in Fig. 7 in which 131 is a sprocket roller supported on a bar 132 which bar may be made to slide horizontally by means of the pinion 135 controlled by the handle 103, the pinion engaging in a rack 133 on the bar 132. When the roller 131 is in proper adjustment, the bar 132 is clamped in place by the screw 104. Each of the negatives to be handled by the mechanism is supplied with one of these adjusting mechanisms, and in the machine illustrated in the drawings, the adjustment for the middle film is above the exposure opening, and for each of the remaining films is below the exposure opening 84.

106 represents a shutter comprising a plate having openings therein, this plate being mounted in guides on the frame 80 so as to be moved past the exposure openings 84. The plate is provided with a rack 110 and through the segmental gears 107, the rack bar 108 and the cam 109 which may be operated by suitable gearing (not shown) from shaft 115, the shutter 106 is reciprocated so that the openings therein pass across the exposure openings 84 once for each exposure.

In the mechanism described, the middle negative is led into the machine by being passed around the bottom guide roller 53, mounted loosely on a stud 54, and independent of the guide rollers 55 and 56. From thence, it passes around the rear side of the middle sprocket 21 on the shaft 83, and around the rear side of the middle sprocket 22 on the shaft 82. It will be noted that there is a loop of slack film formed between the shafts 82 and 83. From 82, the film passes through the chute formed behind the gate 85, over the adjusting sprocket 131, around the sprocket 23 on the shaft 82', then around the rear of the middle sprocket 24 on shaft 81, and over the upper guide roller 12 which is identical in construction with the guide roller 53. The two outer negatives are led in over the upper guide rollers 10 and 11, around the front side of the sprockets 24 on shaft 81, thence through the chute formed behind the gate 85, around the front of the sprockets 22 on the shaft 82, around the front of the sprockets 21 on the shaft 83 and around the guide rollers 55 and 56. A loop is formed in each of these films between the shaft 81 and the film chute, and also between the shafts 82 and 83. Guide or nipping rollers, 57, 58, 59, 60, and 61 are provided on the various sprockets to hold the films in contact therewith.

When the shaft 82 is given an intermittent contra-clockwise motion, the shaft 82' will be given a corresponding clockwise motion. This will result in moving the middle film intermittently upward, and the two outside films intermittently downward. The sprockets 24 and 21 on the shafts 81 and 83 are provided to feed the proper amount of film to be taken up by each of the intermittent motions of the sprockets on the shafts 82 and 82'. While the films are being moved, the shutter 106 covers the exposure openings 84, but as soon as the films have come to rest, the shutter is moved so that its openings pass across the exposure openings 84, and the light from the lamp 31 passes through the pictures held at the exposure openings 84.

Referring now to 34 of Fig. 4, 39 represents generally a lower light-tight film box, and 40 an upper film box of similar construction. 41 is a light-tight tube connecting these two film boxes, and 76 is a lens which focuses the light passing through the negative at the exposure openings 84 onto the sensitized film in the tube 41. The tube 41 has an exposure opening in it in line with openings 84. The mechanism 34 is provided with suitable devices of the well-known type used in printing machines to move the sensitized film intermittently step by step from the box 39, through the tube 41, to the box 40, so as to bring an unexposed portion opposite the exposure opening in 41 at each movement. Reference is made to my co-pending application, Serial No. 654,226 above referred to, for a detailed description of mechanism 34.

As I have pointed out, it is sometimes convenient to join the ends of each of the negatives so as to form a continuous band. This is particularly true when the negatives are relatively short as compared with the total length of sensitized film which the boxes 39 and 40 will hold, since by this means it is possible to print the entire length of the negative several times on the supply of sensitized film without resetting or rewinding the negatives, as would be otherwise required if the negatives were not formed into bands. In the method which I have just described, and in which some of the negatives may be moved in one direction, and some of the negatives moved in the other direction, a film bank of peculiar structure is required. As shown in Figs. 4 and 5, the film bank which I prefer is composed of a series of rollers 66—66 rotated in one direction, and an alternate series of rollers 67—67, rotated in the opposite direction. The rollers 66 are provided with two sets of sprockets 68—68 to engage and drive the two outside negatives handled by the specific mechanism illustrated, and the rollers 67 carry sprockets 69 for moving the middle negative. The middle negative passes into the film bank at the top while the two outside negatives pass into the film bank at the bottom. Rollers 62 and 63 are mounted on vertically adjustable member 64, so as to provide suitable tension for the loops of film. The number of rollers in the film bank, of course, is dependent only on the length of film required to be supported. The rollers 66—67 obtain their motion through the chain 37 driven by a sprocket 70 on the shaft 81 of the negative handling mechanism 33, and the motion between the several rollers is communicated by gearing 71 as shown. The rollers 65 at the bottom of the film bank are idler rollers made up in three parts, each of which rotates independently of the other rollers on the same spindle supporting them, similar to rollers 53, 55 and 56 supported on spindle 54 as shown in Fig. 6.

Briefly described, the operation of the particular form of apparatus herein disclosed is as follows: The main driving shaft 115 of the negative handling mechanism 33 is driven by means of belt 28, connecting pulley 50, fastened to the main shaft 115 and the source of power 38. Shaft 82 with sprockets 22 is operated intermittently from main shaft 115 by the Geneva movement 105 and shaft 82′ with its sprocket 23 is operated in synchronism with shaft 82 by means of bevel gears 13, shaft 51 and bevel gears 14. Shafts 83 and 81 with their sprocket wheels 21 and 24 are continuously rotated from the main shaft 115 by bevel gearing 16. The sprockets 21, 22, 23 and 24 serve to drive the two outside negative films downwardly through mechanism 33 and the middle negative film upwardly, the pictures of all these films being intermittently and successively brought to rest before exposure openings 84 as hereinbefore described. Cam 109 is so shaped and is operated from shaft 115 in such a manner that during movement of the negative films between periods of rest, shutter 106 is moved thereby through rack 108, segmental gears 107 and rack 110 to close exposure openings 84 and shut off the light from lamp 31 and the condensing lenses 32, while, when the negatives are at rest, with a picture of each registering with openings 84, shutter 106 is moved to uncover openings 84 and allow the light from lamp 31 and condensing lenses 32 to pass therethrough and the pictures of the negatives registering therewith to project images of these pictures on the sensitized film of mechanism 34. Power is conveyed to mechanism 34 from main shaft 115 by shaft 47, the sensitized film on which positives are produced from the pictures on negative films 2, 3, and 4 passing through mechanism 33, being moved intermittently step by step from box 39 of mechanism 34 through the light tight tube 41 to the box 40 so as to bring an unexposed portion of the sensitized film opposite the exposure opening in tube 41 at each movement. The sensitized film is moved in synchronism, by mechanism 34, with the negative films 2, 3 and 4 in a manner fully described in my co-pending application referred to above whereby the pictures of the negatives are reproduced upon the sensitized film in the desired arrangement. When the negative films are formed in endless bands or webs, they are passed to and from the mechanism 33 over the rollers 62, 63, 65, 66 and 67 of film bank 36, the rollers of the film bank being suitably operated as by means of sprocket 70 of mechanism 33 and chain 37 connecting the sprocket with the gearing 71 of the film bank. The negatives may be separately adjusted in the mechanism 33 so as to bring the pictures thereof in alinement by independent mechanisms, each comprising roller 131, bar 132 provided with rack 133, pinion 135, and handle 103.

While I have illustrated and described a printing mechanism handling only three negatives, and particularly adapted to handle the negatives 2, 3 and 4 shown in Fig. 3, so as to produce the positive shown in Fig. 1, it will be understood, of course, that I am not limited to this specific mechanism. Any number of films may be moved in one direction and any number in the opposite direction, in the mechanism shown, by so constructing the machine as to provide a suitable number of sprocket wheels on the several shafts, bearing in mind that shaft 82 is used to give an intermittent motion to a series of films in one direction, and shaft 82′ to a series of films in the opposite direction.

Having now described my invention, what I claim is:

1. The method of printing from a plurality of separate original negatives having the pictures all in the same sequence, a single positive motion picture film which shall have a plurality of rows of pictures thereon, some of which shall be in original and some in reversed sequence, such method consisting in first assembling the said negatives side by side and with the first picture in the series of pictures on one negative in alinement with the last picture in the series of pictures on any adjacent negative, moving all of the negatives the pictures of which are to be printed in original sequence in one and the same direction, and all of the negatives the pictures of which are to be printed in reversed sequence in the opposite direction to bring different pictures of each of the negatives successively in alinement, moving a sensitized film simultaneously and synchronously with the said negatives and in a given direction, and successively passing light through the different alined pictures of the negative films simultaneously and onto successive portions of the said sensitized film, substantially as described.

2. The method of printing from a plurality of separate original negatives having the pictures all in the same sequence, a single positive motion picture film which shall have a plurality of rows of pictures thereon, some of which shall be in original and some in reversed sequence, such method consisting in first assembling the said negatives side by side and with the first picture in the series of pictures on one negative in alinement with the last picture in the series of pictures on any adjacent negative, successively moving all of the negatives the pictures of which are to be printed in original sequence in one and the same direction, and all of the negatives the pictures of which are to be printed in reversed sequence in the opposite direction to bring different pictures of each of the negatives successively in alinement, successively moving a sensitized film simultaneously and synchronously with the said negatives and in a given direction, and successively passing light through the different alined pictures of the negative films simultaneously and onto successive portions of the said sensitized film, substantially as described.

3. The method of printing from a plurality of separate original negatives having the pictures all in the same sequence, a single positive motion picture film which shall have a plurality of rows of pictures thereon, some of which shall be in original and some in reversed sequence, such method consisting in first assembling the said negatives side by side and with the first picture in the series of pictures on one negative in alinement with the last picture in the series of pictures on any adjacent negative, moving all of the negatives the pictures of which are to be printed in original sequence in one and the same direction, and all of the negatives the pictures of which are to be printed in reversed sequence in the opposite direction to bring different pictures of each of the negatives successively in alinement, moving a sensitized film simultaneously and synchronously with the said negative and in the same direction as the negative films the pictures of which are to be printed in reversed sequence, and successively passing light through the different alined pictures of the negative films simultaneously and onto successive portions of the said sensitized film through a lens focused on the sensitized film, substantially as described.

4. The method of printing from a plurality of separate original negatives having the pictures all in the same sequence, a single positive motion picture film which shall have a plurality of rows of pictures thereon, some of which shall be in original and some in reversed sequence, such method consisting in first assembling the said negatives side by side and with the first picture in the series of pictures on one negative in alinement with the last picture in the series of pictures on any adjacent negative, successively moving all of the negatives the pictures of which are to be printed in original sequence in one and the same direction, and all of the negatives the pictures of which are to be printed in reversed sequence in the opposite direction to bring different pictures of each of the negatives successively in alinement, successively moving a sensitized film simultaneously and synchronously with the said negatives and in the same direction as the negative films the pictures of which are to be printed in reversed sequence, and successively passing light through the different alined pictures of the negative films simultaneously and onto successive portions of the said sensitized film through a lens focused on the sensitized film, substantially as described.

This specification signed and witnessed this 24" day of July, 1914.

ADOLPH F. GALL.

Witnesses:
WOLDEMAR HAUPT,
HENRY HASPER.

Corrections in Letters Patent No. 1,187,137.

It is hereby certified that in Letters Patent No. 1,187,137, granted June 13, 1916, upon the application of Adolph F. Gall, of West Orange, New Jersey, for an improvement in "Production of Motion-Picture Films," errors appear in the printed specification requiring correction as follows: Page 1, line 49, after the word "all" insert the article *the;* page 4, line 109, and page 6, line 70, claim 3, for the word "negative" read *negatives;* and that the said Letters Patent should be read with these corrections therein that the same may conform to the record of the case in the Patent Office.

Signed and sealed this 13th day of February, A. D., 1917.

[SEAL.] R. F. WHITEHEAD.
*Acting Commissioner of Patents.*

Cl. 88—24.